UNITED STATES PATENT OFFICE.

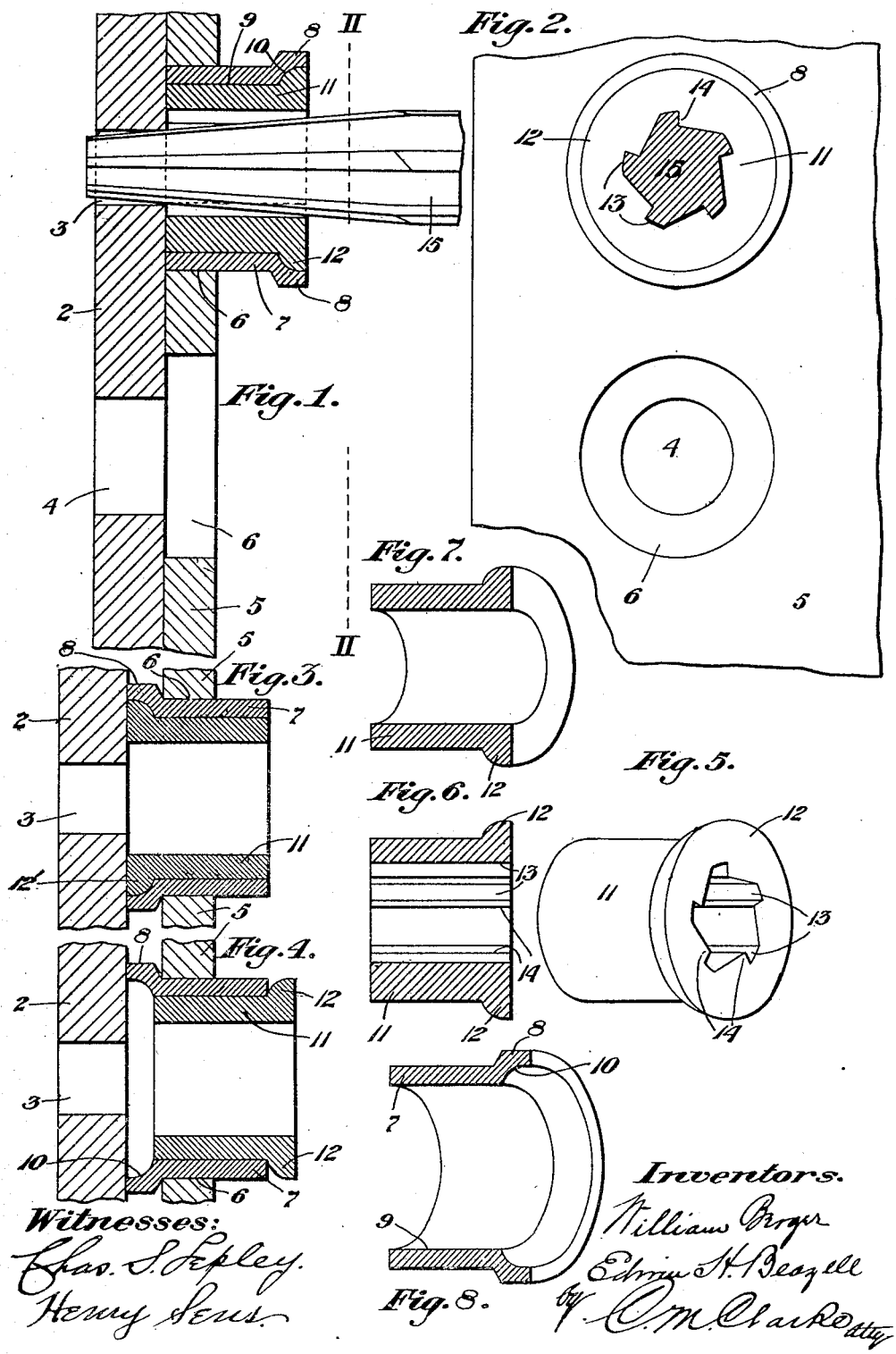

WILLIAM BERGER AND EDWIN H. BEAZELL, OF CANONSBURG, PENNSYLVANIA, ASSIGNORS TO FORT PITT BRIDGE WORKS, OF PITTSBURG, PENNSYLVANIA, A CORPORATION OF PENNSYLVANIA.

TEMPLET DRILLING AND REAMING DEVICE.

No. 913,455.　　　Specification of Letters Patent.　　　Patented Feb. 23, 1909.

Application filed May 29, 1908. Serial No. 435,702.

*To all whom it may concern:*

Be it known that we, WILLIAM BERGER and EDWIN H. BEAZELL, citizens of the United States, residing at Canonsburg, in the county of Washington and State of Pennsylvania, have invented certain new and useful Improvements in Templet Drilling and Reaming Devices, of which the following is a specification, reference being had therein to the accompanying drawings.

Our invention refers to improvements in templet drilling and reaming devices for drilling or reaming metal plates, girders beams, etc., and it has for its object to provide means for accurately drilling or reaming holes in the metal, either to enlarge or finish previously punched holes or to completely drill the holes, and to provide means whereby a reamer or twist drill may be positively and accurately maintained in alinement with relation to the metal being reamed or drilled within a surrounding thimble rotatably mounted with the reamer or drill within a surrounding bushing, operable within a templet or jig located in fixed relation to the metal being operated upon.

A feature of advantage is in accurately guiding and protecting the edges of the reamer or drill so as to prevent undue wear or friction.

The preferred form of the invention is illustrated in the accompanying drawings, in which:—

Figure 1 is a sectional view showing a plate and templet in operative position and the reamer with its surrounding thimble or bushing set therein. Fig. 2 is a face view, partly in section indicated by the line II. II. of Fig. 1. Figs. 3 and 4 are sectional views similar to Fig. 1 showing different arrangements of the parts. Fig. 5 is a detail perspective view of the rotatable thimble or bobbin detached. Fig. 6 is a transverse sectional view of the thimble. Fig. 7 is a similar view showing a smooth center thimble for use with a twist drill. Fig. 8 is a sectional perspective view of the bushing.

2 represents the plate or other article to be drilled which is ordinarily previously punched with a series of holes 3 of less diameter than the finished hole 4 when reamed. Said holes 3, due to the preliminary operation of punching, are ordinarily more or less inaccurately spaced and the surrounding metal is usually distorted in its fiber and is ordinarily finally removed by the reamer. The invention has in view the provision of means for positively centering the reamer or drill irrespective of such variation or of variation in the "center" holes, and for removing the distorted metal so as to produce accurately spaced holes of the desired finished diameter, the reaming operation removing the surrounding distorted metal in producing the enlarged hole.

5 represents the templet or jig, provided with a series of holes 6, the centers of which accurately conform to the centers of the finally reamed or drilled holes and which approximately conform to the previously punched holes 3, (when such holes are punched), or locate the exact position for the finished holes in any case. The templet 5 is located in position and rigidly attached to the plate 2 or other article by any suitable clamping or holding means, not shown, preliminarily to the operation of using our invention.

7 represents a bushing adapted to accurately fit within the holes 6, a bushing and its thimble being provided for each templet hole, or a single set being used successively for each operation. Said bushing is preferably shouldered as indicated at 8 to provide a limiting abutment against inward travel and a bearing for the outer face of the templet, although the bushing 7 may with equally good results be merely set against the face of the article, as shown in the drawings.

The plate and templet may also be spaced apart and the bushing reversed, as shown in Figs. 3 and 4, thereby positively holding the bushing against longitudinal movement due to the reaming or drilling tool, and the thimble may also be mounted so as to be retained by the bushing as in Fig. 3 or removably as in Fig. 4.

The interior of bushing 7 is accurately finished concentric with its exterior surface as indicated at 9, and is preferably provided with an annular receiving recess 10 for a corresponding annular shoulder of the reamer or drill-receiving thimble 11. Said thimble accurately fits within the bushing 7, as shown in the several arrangements, being preferably provided with an outer annular flange or collar 12 adapted to fit in said recess 10, and is ordinarily provided in its interior with a series of longitudinally arranged grooves 13 and intervening shoulders or wings 14 adapted to correspond with the cross section of the reamer 15 and to make interfitting engagement with the cutting wings thereof, as will be readily understood. The thimble may also be made with a smooth interior as shown in Fig. 7, for use with an ordinary twist drill, and will operate to positively center and maintain the drill in alinement, the thimble being retained against longitudinal movement in the bushing by the terminal collar 12'.

The operation is as follows: The templet and article 2 having been assembled in position, the bushing 7 and its thimble 11 are fitted within one of the holes 6, the bushing preferably making a neat fit therein and the end of the reamer 15 is introduced as shown in Fig. 1. Rotation of the reamer results in a corresponding rotation of thimble 11 within bushing 7, by inter-engagement of the wings, and as the reamer advances toward and through the article 2 it will be seen that it is positively guided within its surrounding thimble which in turn bears and rotates within the outer bushing 7, due to engagement of its interior by the drill wings and the mounting of the thimble in the bushing which is held within the holes of the templet. The reamer is thus completely protected against wear by the thimble, preventing contact with the bushing, so that its cutting parts have no contact except with the article being drilled.

The advantages of the invention will be apparent to those skilled in the art and in practice it has been found to give accurate and efficient results. The tendency of the reamer to deflect laterally by reason of variation in the previously punched holes 3 from the true center in no way effects the reamer, which by its thimble and the bushing within the templet is always maintained in positive alinement with the desired center of the finished hole 4.

When used with an ordinary twist drill, the plate may be entirely drilled without the necessity of previously punched center holes, and the drill will be prevented from any deflection whatever, due to inequalities in the texture of the metal, variation in the center hole spacing, or to any other cause.

The device is comparatively simple and inexpensive, it may be used singly or with a gang of reamers or drills, and when used in series may be quickly and readily inserted for operation and withdrawn, or inserted singly and replaced in the next adjacent templet hole without appreciable loss of time.

The invention may be changed or varied in design or different details; it may be used with reamers or drills having spiral or straight wings or of various cross sections, but all such changes are to be considered as within the scope of the following claims.

What we claim is:—

1. The combination with a jig provided with a centering opening, of a bushing inserted in said opening, and a thimble rotatably mounted in the bushing and provided with an interiorly fluted tool-receiving opening and a retaining collar, substantially as set forth.

2. The combination with a jig provided with a centering opening, of a bushing mounted in said opening, and a thimble rotatably mounted in said bushing and having a fluted tool-receiving opening, substantially as set forth.

3. A drill housing consisting of an outer bushing and an inner rotatable thimble having means for engaging a longitudinally grooved tool for rotation of the thimble by the tool within the bushing, substantially as set forth.

4. A drill housing consisting of an outer bushing and an inner rotatable thimble having interior longitudinal channels for engagement with a cutting tool, substantially as set forth.

5. A drill housing consisting of an outer bushing and an inner rotatable thimble concentric therewith provided with a retaining flange and interior longitudinal channels, substantially as set forth.

6. The combination of a bushing provided with a retaining collar and an interior annular recess, and a rotatable thimble mounted in the bushing having an annular collar adapted to fit within said recess, substantially as set forth.

7. The combination of a bushing provided with a retaining collar and an interior annular recess, and a rotatable thimble mounted in the bushing having interior longitudinal channels and an annular collar adapted to fit within said recess, substantially as set forth.

In testimony whereof we affix our signatures in presence of two witnesses.

WILLIAM BERGER.
EDWIN H. BEAZELL.

Witnesses:
  T. M. TOBIN,
  GEO. DOWSWELL.